(12) United States Patent
Farineau et al.

(10) Patent No.: US 8,891,440 B2
(45) Date of Patent: Nov. 18, 2014

(54) TRANSMISSION OF CONTROL INFORMATION AFTER OPTIONAL SELECTION AND COMPRESSION WITHIN A RADIO COMMUNICATION NETWORK

(75) Inventors: Jean Farineau, Levallois Perret (FR); Vincent Rougier, Paris (FR); Jean-Noël Lignon, Frouzins (FR); Christelle Aime, Bougival (FR); Christophe Levallet, Chatou (FR); Christian Poli, Eaubonne (FR); Marcel Le Goff, Marines (FR); Eric Vitureau, La Garenne Colombes (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1544 days.

(21) Appl. No.: 11/569,590

(22) PCT Filed: May 10, 2005

(86) PCT No.: PCT/FR2005/050306
§ 371 (c)(1),
(2), (4) Date: Jun. 12, 2007

(87) PCT Pub. No.: WO2005/119967
PCT Pub. Date: Dec. 15, 2005

(65) Prior Publication Data
US 2008/0008115 A1    Jan. 10, 2008

(30) Foreign Application Priority Data

May 24, 2004 (FR) ...................................... 04 51014

(51) Int. Cl.
*H04W 4/00*      (2009.01)
*H04B 7/00*      (2006.01)
(Continued)

(52) U.S. Cl.
CPC ........ *H04B 7/18543* (2013.01); *H04L 41/0213* (2013.01)
USPC ........... 370/328; 370/310; 370/313; 370/349; 455/466; 455/560

(58) Field of Classification Search
USPC .............. 455/403, 418–420, 422.1, 423–425, 455/434, 453, 466, 500, 502, 514, 455/560–561; 370/310, 312–313, 328, 338, 370/349–350, 395.5, 446, 469, 471; 717/100–101, 120, 126, 167–168, 151, 717/174; 709/220–221, 223–224, 230, 242, 709/244
See application file for complete search history.

(56) References Cited

U.S. PATENT DOCUMENTS 5,842,125 A * 11/1998 Modzelesky et al. ...... 455/426.1
6,094,678 A    7/2000 Nethercott et al.
(Continued)

FOREIGN PATENT DOCUMENTS

| WO | WO 01/47182 A2 | 6/2001 |
| WO | WO 02/37880 A1 | 5/2002 |
| WO | WO 03/019876 A1 | 3/2003 |

*Primary Examiner* — Meless Zewdu
(74) *Attorney, Agent, or Firm* — Fay Sharpe LLP

(57) ABSTRACT

A remote transmission station (S1), for a transmission installation (ID) in a radio communication network with a control unit (MS) for transmission stations with selected administration protocol, comprises controlled units (E11, E21) and is located in a part of the network separated from the control unit (MS) by a transmission connection (SAT) within the installation (ID). The station (S1) further comprises control means (MG) for obtaining control information statuses relating to the controlled units (E) and processing means (MT) for i) storage of the states previously obtained by the control means (MG), ii) for comparison of the currently obtained states with the states previously stored and to determine each change in state and iii) to generate messages comprising each determined change in state for transmission thereof to the control unit (MS) by the connection (SAT).

14 Claims, 2 Drawing Sheets

Figure 1:
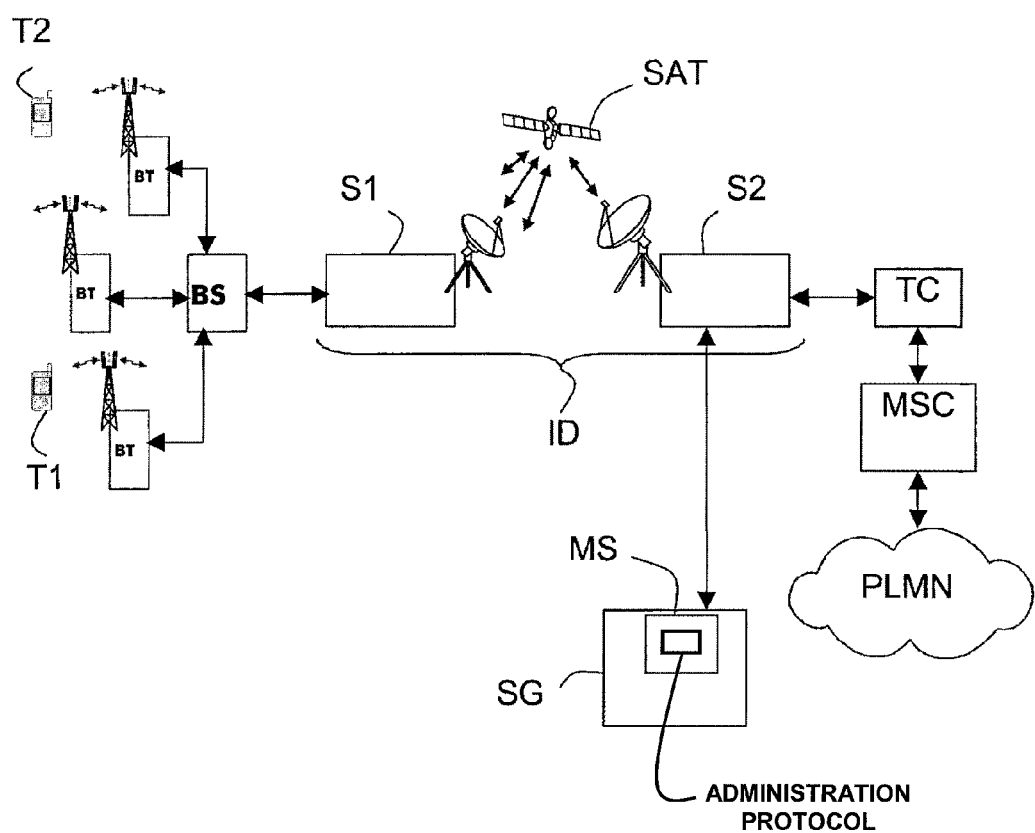

(51) Int. Cl.
*H04H 20/67* (2008.01)
*H04B 1/38* (2006.01)
*H04M 1/00* (2006.01)
*H04B 7/185* (2006.01)
*H04L 12/24* (2006.01)

(56) References Cited

U.S. PATENT DOCUMENTS

| | | | |
|---|---|---|---|
| 6,097,952 A * | 8/2000 | Kawabata | 455/435.1 |
| 6,112,085 A * | 8/2000 | Garner et al. | 455/428 |
| 6,292,472 B1 * | 9/2001 | Rariden et al. | 370/254 |
| 6,538,556 B1 * | 3/2003 | Kawajiri | 340/3.2 |
| 6,571,285 B1 * | 5/2003 | Groath et al. | 709/223 |
| 6,640,101 B1 * | 10/2003 | Daniel | 455/423 |
| 6,757,280 B1 * | 6/2004 | Wilson, Jr. | 370/389 |
| 6,961,579 B2 * | 11/2005 | Inukai et al. | 455/456.4 |
| 6,983,317 B1 * | 1/2006 | Bishop et al. | 709/223 |
| 7,096,299 B2 * | 8/2006 | Meynard | 710/304 |
| 7,197,561 B1 * | 3/2007 | Lovy et al. | 709/224 |
| 7,499,401 B2 * | 3/2009 | Buddhikot et al. | 370/235 |
| 2003/0182472 A1 * | 9/2003 | Duffy et al. | 709/400 |
| 2004/0097224 A1 * | 5/2004 | Lim | 455/425 |
| 2004/0127221 A1 * | 7/2004 | Takano et al. | 455/445 |

* cited by examiner

TRANSMISSION OF CONTROL INFORMATION AFTER OPTIONAL SELECTION AND COMPRESSION WITHIN A RADIO COMMUNICATION NETWORK

The invention concerns the field of radio communication networks including a data transmission installation, and more particularly the transmission of management information traffic within such networks.

Here "radio communication networks including a data transmission installation" means satellite or terrestrial radio communication networks, such as GSM/GPRS or UMTS networks, using at least one data transmission installation over a portion of their connections.

Moreover, "data transmission installation" means an installation including first and second transmission stations able to transmit data to each other, generally in compressed form, via a particular terrestrial (cable or radio) or satellite link. The first and second transmission stations can be installed at the level of the A-bis interface of the network, i.e. between certain of its base stations and its associated base station controller, the A-ter interface, i.e. between its base station controller and a transcoder coupled to an associated call switch (or MSC, standing for "Mobile-services Switching Center") and responsible for converting compressed voice into digitized speech at 64 kbps (kilobits per second), or the A interface, i.e. between said transcoder and the call switch.

As the person skilled in the art knows, using a transmission installation may be a particularly attractive solution for radio communication network operators wishing to deploy their networks rapidly. This is in particular the case when the transmission installation is a satellite relay installation, since it enables deployment of sites that are very widely spread out geographically and/or dispersed over large territories, without necessitating a cumbersome and costly terrestrial infrastructure.

Satellite relay enables signaling and traffic to be transmitted from a remote portion of the network connected to a first satellite station to another portion of the network, known as the central portion, connected to a second satellite station coupled to the first satellite station via a communication satellite and itself coupled to the core network. For example, this enables the transmission of management information relating to managed equipments constituting a first satellite station to a satellite station management module that is optionally coupled to the core network.

A dedicated service channel of fixed capacity may be used to transmit the management stream, for example at the level of the satellite link. However, this solution has at least two drawbacks. A first drawback results from the fact that capacity continues to be reserved for the dedicated service channel even if there is no management stream to be transmitted, which is a particular nuisance given the extremely high cost of leasing satellite capacity. A second drawback results from the fact that because of the aforementioned cost there is generally a requirement to minimize the capacity allocated to the dedicated service channel, with the result that the management stream throughput is therefore low, which leads to relatively slow updating of management indicators and relatively slow action in response to commands.

In an attempt to solve these problems, it has been proposed to multiplex the management streams with payload traffic. However, this necessitates the installation of relatively costly multiplexing equipment at each end of the satellite link.

Multiplexing and compressing the management streams has also been proposed. However, this necessitates multiplexing equipment and compression/decompression equipment at each end of the satellite link, which considerably increases the cost of satellite relay.

No prior art solution being entirely satisfactory, an object of the invention is therefore to improve on the situation currently encountered in satellite or terrestrial radio networks including at least one transmission installation, for example of the satellite type.

To this end the invention proposes a remote transmission station for a transmission installation of a radio communication network comprising a chosen administration protocol transmission station management equipment.

This remote transmission station is characterized in that it comprises management means adapted to obtain management information states relating to its managed equipments and processing means adapted i) to store all states previously obtained by the management means, ii) to compare the newly obtained states with the states previously stored, in order to determine each state variation, and iii) to generate messages including each state variation that has been determined in order for them to be sent to the management equipment of the transmission stations of the network via the transmission link of the installation.

Here "state" means in particular the state of a parameter of a managed equipment MIB or the state of a set of parameters such as those contained in managed equipment memories.

The remote transmission station according to the invention may have other features and in particular, separately or in combination:

- its processing means may be adapted to associate with each state variation an identifier representing the management information and of the managed equipment corresponding thereto and to integrate each state variation and the associated identifier into the messages,
- if at least one of the managed equipments, referred to as first equipments, comprises a local protocol agent coupled to a primary management information base in which its current management information states are stored, its management means comprise a main protocol agent adapted to dialog with each local protocol agent in order to obtain all the states stored in the associated management information base,
- if at least one of the managed equipments, referred to as second equipments, comprises a memory in which their current management information states are stored and control means coupled to the memory and adapted to be consulted by means of a specific management protocol, its management means comprise mediation means adapted to dialog with each of the control means according to the associated protocol in order to obtain all of the states stored in the memories to which they are coupled,
- its mediation means may define local protocol agents each associated with one of the second equipments and adapted to supply the main protocol agent with states coming from the second equipments,
- its processing means may be adapted to associate a chosen priority level with each state variation that has been determined as a function of a control table so that priority is given to sending the state variation having the highest priority level; if the control table further defines the timing of state variation transmission, its processing means are preferably adapted to generate the messages as a function of the timing,
- a managed equipment defining a data compressor/decompressor adapted to compress data in accordance with a chosen method, including data contained in the messages, to be transmitted via the transmission link, and to decompress data compressed in accordance with the chosen method and received via the transmission link; there may additionally be provided another managed equipment defining another data compressor/decompressor substantially identical to the first one, with one operating and the other on standby, and each data compressor/decompressor further comprising observation means adapted to observe the operation of the other compressor/decompressor to force its own compressor/decompressor to operate in place of the other one in the event of detection of a problem with the operation of the latter, the administration protocol may be the SNMP (Simple Network Management Protocol) protocol, for example, each local agent then being an SNMP agent and the main protocol agent then being an SNMP manager.

The invention also proposes a central transmission station for a transmission installation of a radio communication network comprising a chosen administration protocol transmission station management equipment.

This central transmission station is characterized in that it comprises, firstly, memories each associated with one of the managed equipments of a remote transmission station of the type described above and wherein are stored the latest known management information states relating to each of the managed equipments and, secondly, processing means adapted to analyze the messages received from the remote transmission station via the transmission link of the installation, to extract the state variations that they contain and then to compare them to the corresponding states stored in the memories in order to determine the corresponding new states and to update the memories with the new states that have been determined.

The central transmission station according to the invention may have other features and in particular, separately or in combination:

each of its memories may constitute a secondary management information base, protocol agents the number whereof is equal to the number of managed equipments of the remote transmission station, each of which is coupled to the processing means and to one of the memories, and each of which is adapted to consult the associated memory at the request of the management equipment with a view to sending it the current management information states, its processing means may be adapted to generate control messages and/or configuration messages to the remote transmission station with a view to obtaining state variations relating to at least one of its managed equipments and/or to configuring the managed equipments, a managed equipment defining a data compressor/decompressor adapted to decompress data in accordance with a chosen method, including data contained in the messages received via the transmission link, and to compress data in accordance with the chosen method with a view to sending it to the remote transmission station via the transmission link, the administration protocol may be the SNMP protocol, for example.

The invention also proposes a transmission installation for a radio communication network comprising a transmission station management equipment, including at least one remote transmission station and at least one central transmission station of the type described above.

This transmission installation constitutes a satellite relay installation, for example, in which the transmission link is provided by a communication satellite and the remote transmission station and the central transmission station are satellite stations.

The invention is particularly well adapted, although not exclusively so, to mobile communication networks, for example TDMA or CDMA type cellular networks, and in particular GSM, GPRS, EDGE and UMTS networks. However, the invention is equally adapted to satellite communication networks using GEO, MEO or LEO type satellites. The invention is further adapted to terrestrial communication networks using cable, optical fiber or wireless connections, for example.

The invention is particularly well adapted, although not exclusively so, to networks using satellite relay over a portion of their connections.

Moreover, the invention applies to any type of management stream, whether transmitted in raw or compressed form.

Figure 2:
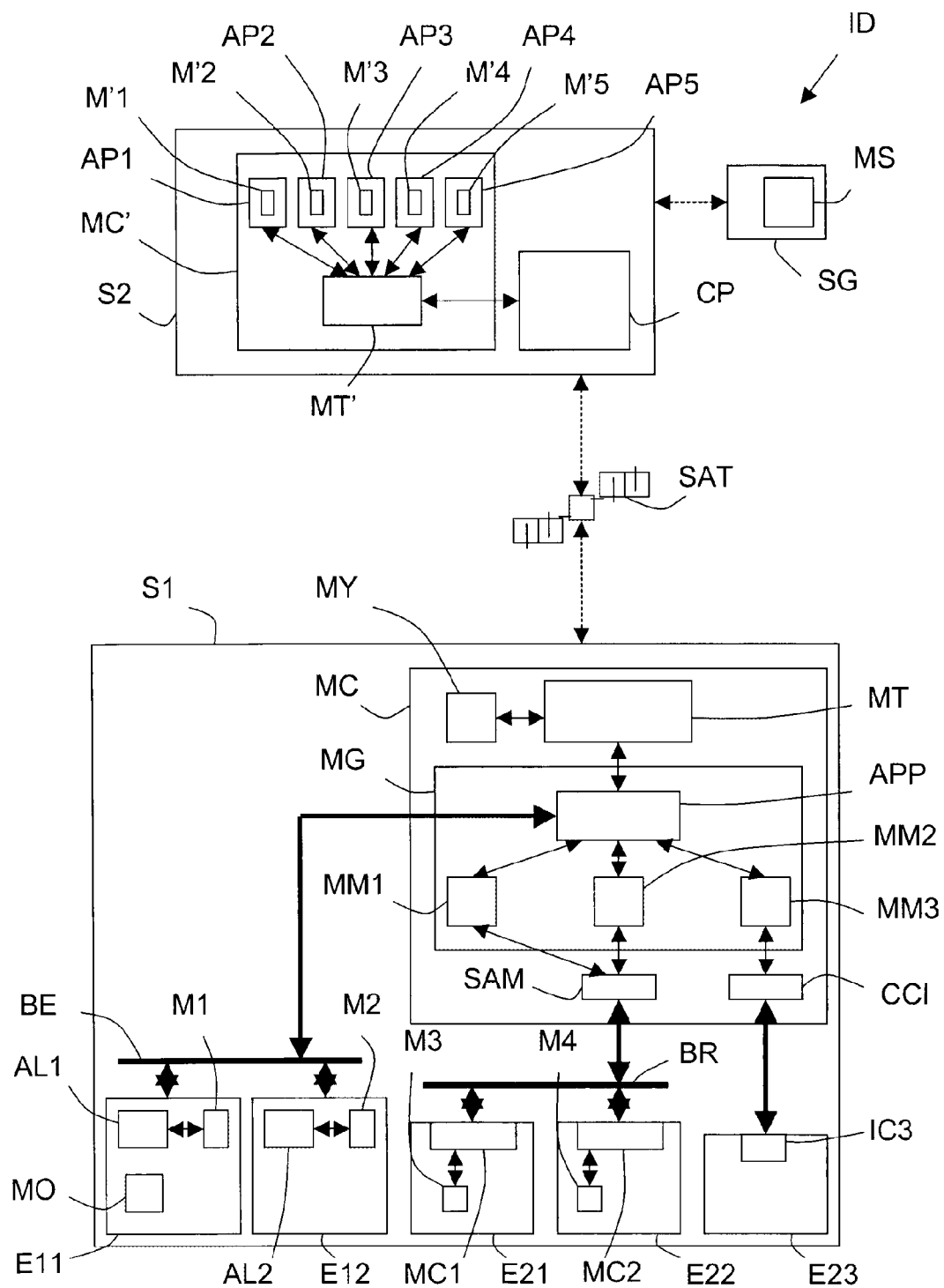

Other features and advantages of the invention will become apparent on examining the following detailed description and the appended drawings, in which:

FIG. 1 is a diagram of one example of a radio communication network comprising a satellite relay installation according to the invention, and FIG. 2 is a functional block diagram of one example of a satellite relay installation according to the invention.

The appended drawings constitute part of the description of the invention as well as contributing to the definition of the invention, if necessary.

An object of the invention is to limit the data transmission capacity of a dedicated transmission connection in a radio communication network.

FIG. 1 is referred to first in order to describe a radio communication network including a transmission installation ID according to the invention.

The radio network is considered hereinafter to be of the GSM/GPRS type. However, the invention is not limited to that type of network. It concerns all terrestrial radio networks, in particular those of the EDGE or UMTS type, and generally terrestrial radio communication networks such as those of the TDMA or CDMA type. It relates equally to satellite communication networks.

Moreover, "transmission installation" means hereinafter a satellite relay installation including a remote satellite station S1, at least one central satellite station S2 and a satellite link provided by a communication satellite SAT. However, the invention is not limited to this type of transmission installation. In fact it relates to any type of transmission installation including at least one remote transmission station, at least one central transmission station and a cable or other transmission network for coupling the various stations.

Broadly speaking, but in sufficient detail for the invention to be understood, a satellite relay GSM/GPRS network like that shown in FIG. 1 comprises:

base transceiver stations (BTS) including radio equipment providing a connection to mobile communication terminals, one or more base station controllers (BSC) which are responsible for management of the radio resources and to which one or more base transceiver stations BTS are connected, at least one satellite link including a communication satellite SAT, a first satellite communication station S1 and a second satellite communication station G2, generally taking the form of a gateway and responsible for transmitting traffic and signaling via the satellite SAT, and at least one central call switch MSC (standing for "Mobile-services Switching Center") responsible for managing calls set up in the geographical sector covered by the base transceiver stations BTS coupled to the base station controller(s) BSC to which it is coupled, via the satellite SAT, and connected to the core network (here of the PLMN type, standing for "Public Land Mobile Network") and preferably (and as shown) a transcoder TC responsible for converting compressed voice into digitized speech at 64 kbps (kilobits per second) and vice-versa.

In the example shown, the satellite link is installed at the level of the A-ter interface of the network, i.e. between the base station controller BSC and the transcoder TC. Consequently, the first satellite station S1 (also referred to as the remote station) is connected to the base station controller BSC, whereas the second satellite station S2 (also referred to as the central station) is connected to the transcoder TC. However, the satellite link may be installed at the level of the A-bis interface of the network, i.e. between the base transceiver stations BTS and the associated base station controller BSC, or at the A interface, i.e. between the transcoder TC and the central call switch MSC. These interfaces are defined by the G.703 standard in respect of the physical layer and the G.704 standard in respect of framing (generally at 2048 kbps).

In such networks, management streams specific to the radio communication network are exchanged over the A-bis interface by means of multiple signaling channels (at least one channel per base transceiver station BTS), each occupying either one byte (in the case of 64 kbps channels) or two bits per frame (in the case of 16 kbps channels).

Traffic streams specific to the radio communication network are exchanged over the A-bis interface by means of traffic channels TCH. Each traffic channel TCH then occupies either two bits per frame (in the case of a 16 kbps full rate (FR) type channel) or one bit per frame (in the case of an 8 kbps half rate (HR) type channel). In the case of a voice call, one traffic channel TCH is used in each direction, of exactly the same size and at exactly the same position in each incoming or outgoing E1 frame at a given physical port.

In a satellite relay network, the remote station S1 generally comprises a plurality of transmission equipments managed, controlled and configured by control messages and configuration messages produced by a station management module MS using a selected administration protocol. This station management module MS is installed in a management server SG coupled to the central transmission station S2, for example.

Remember that management of the transmission means is generally separate from management of the radio communication network (different protocols and different objectives).

The equipment managed includes in particular the radio frequency (RF) power amplifier, the frequency changing equipment, the modem, the compressor/decompressor, the redundancy switches and the ancillaries, for example alarm and surveillance devices (flood, fire, intrusion and the like), air conditioning plant, and electrical power supply equipment (battery coupled to solar panels and/or generator set).

When the administration protocol selected is the SNMP (Simple Network Management Protocol) protocol, the station management module MS is called the SNMP manager. It is considered hereinafter by way of illustrative example that the selected administrative protocol is the SNMP protocol.

Certain control messages generated by the SNMP manager MS require the remote station S1 and the central station S2 to transmit the management information states of their managed equipment so that the operator knows their operational status and can make decisions quickly in the event of a problem. The invention is primarily operative in the mechanism for feeding back management information states of the equipment managed by the remote station S1, separated from the SNMP manager MS by the satellite link SAT (in particular).

More precisely, an object of the invention is to reduce the capacity reserved for the transmission of management information states of the managed equipment of the remote station S1 and for the transmission of control and/or configuration messages to said remote station S1, at the level of the transmission connection (here the satellite link) set up between the remote station S1 and the central station S2.

To this end the invention proposes that the remote station S1 comprise (as shown in FIG. 2) or be coupled to a control module MC including in particular a management module MG coupled to a processing module MT.

The management module MG obtains management information states relating to the managed equipment E1$i$ (here i=1 and 2) and E2$j$ (here j=1 to 3) of the remote station.

Here "state" means the state of a parameter of a managed equipment MIB or the state of a set of parameters such as those contained in managed equipment memories M3-M4. Here the status word therefore concerns, in particular, data having a limited number of possible values (for example binary indicators), and parameter values, for example of the counter type.

The processing module MT is responsible for storing in a dedicated memory MY all of the states that have previously been obtained by the management module MG, for comparing the states newly obtained to the states that it has previously stored to determine each state variation that has occurred since the last state was obtained, and to generate messages including each state variation determined in order for them to be transmitted to the SNMP manager MS via the satellite SAT (in particular).

When the processing module MT generates a message including data defining at least one state variation, it preferably associates with that state variation an identifier that represents the corresponding management information and the corresponding managed equipment. This kind of identifier may be of the OID (Object IDentifier) type, for example.

The management module MG may take various forms according to the managed equipment type or types of the remote station S1 in which it is installed (or to which it is coupled). Three situations may be envisaged.

In a first situation all the managed equipments include a local protocol agent AL (here of the SNMP agent type) responsible in particular for responding to requests that it receives in accordance with the administration protocol (here the SNMP) and for determining within a management information base (MIB) the state of each item of management information designated in the request in order to communicate it to the network element that generated the request.

In a second situation none of the managed equipments includes a local protocol agent AL.

In a third situation certain managed equipments include a local protocol agent AL and others do not. This situation is shown in FIG. 2. More precisely, in the example shown the remote station S1 includes two managed equipments E11 and E12 each having a local SNMP agent AL1, AL2 and an MIB M1, M2 and three managed equipments E21, E22 and E23 having no SNMP agent.

The two managed equipments E11 and E12, and therefore their two local SNMP agents AL1 and AL2, are connected to the management module MG via a local network BE, for example of the Ethernet type. The managed equipment E11 is a data compressor/decompressor, for example, and the managed equipment E12 is a modem, for example.

Each of the two managed equipments E21 and E22 includes a control module MC1, MC2 coupled to a memory M3, M4 in which the accessible management information states are stored and responsible for responding to requests that it receives in accordance with a chosen management protocol and for determining within the memory M3, M4 the state of each item of management information designated in the request in order to communicate it to the network element that generated the request. They are connected to the management module MG via a bus BR, for example of the RS-485 type, itself connected to a serial access manager (SAM) module. The managed equipment E21 is a radio-frequency (RF) power amplifier, for example, and the managed equipment E22 is a frequency changer, for example.

Finally, the managed equipment E23 includes no control module capable of exchanging messages. This kind of equipment generally has simple inputs/outputs, of relay and relay contact type, enabling reception of basic activation commands and provision of binary indications as to the state of the monitored units. This kind of equipment is connected via its IC3 (cable interface) device to the management module MG via a cable connection itself connected to an ancillary interface CCI (contact closure interface) on the management module MG side. The managed equipment E23 is an ancillary equipment, for example, such as an intruder detector or air conditioning plant.

In this example, the management module MG includes a main protocol agent APP of the SNMP manager type responsible for dialog via the Ethernet bus BE with the local SNMP agents of the managed equipments E11 and E12 in order to obtain all of the states that are stored in the associated MIB M1 and M2.

The other managed equipments E2j have no SNMP local agent and the management module MG also includes mediation modules MMj, the number of which is equal to the number of managed equipments having no SNMP local agent. Each mediation module MMj is adapted to dialog with a control module MCj via the serial access manager module SAM using its management protocol or to monitor via the ancillary interface CCI equipments having a cable interface such as the interface IC3. Thus each mediation module MMj can obtain from the managed equipment E2j with which it is associated all of the states that are stored in its memory M3 or M4 or determine the state of the units controlled via the cable interface IC3.

Moreover, each mediation module MMj is responsible for converting to the format of the SNMP protocol the messages and information that come from the managed equipment E2j with which it is associated and in accordance with its protocol format. Accordingly, each mediation module MMj can send the SNMP manager APP messages to the format of the administration protocol (SNMP) that it uses and that it can therefore read directly.

Moreover, each mediation module MMj is responsible for converting requests and commands coming from the SNMP manager APP in the SNMP format into requests and commands in the format of the management protocol of the managed equipment E2j with which it is associated.

The SNMP manager APP can thus obtain all the current states of the accessible management information on each managed equipment E1i, E2j in accordance with the same format and can therefore communicate them to the processing module MT in order for it to be able to compare them with preceding states stored in the dedicated memory MY with a view to determining state variations. The SNMP manager APP therefore plays, so to speak, the role of a proxy type manager vis à vis equipments managed locally and management equipments situated upstream, which will use the information fed back by the processing module MT (it therefore has an information relay role).

It is important to note that in the presence of managed equipments that all have a local protocol agent AL, the management module MG consists only of a main protocol agent (or SNMP manager) APP.

The processing module MT may further be responsible for establishing transmission relative priorities of the state variations that it has determined. It then has an update control table priority information wherefrom enables it to associate a chosen priority level with each state variation that has been determined. For example, statistical type data, that generally represents a large volume of information, may be assigned a lower level of priority, whereas alarm information can be transmitted with the highest priority level.

The update control table may equally include information defining the timing with which the state variations of the various kinds of management equipment must be transmitted to the SNMP manager MS of the network via the satellite SAT. With a view to being communicated via the satellite SAT to the central station S2, these messages, generated by the processing module MT and including the state variations, can therefore be multiplexed by the compressor/decompressor of the remote station in accordance with the intended timing and as a function of the transmission capacity that is not used by the traffic streams.

If the volume of traffic tends to saturate the available transmission capacity, the processing module MT reduces the rate of updating of non-critical data, such as statistical data in particular, and continues to prioritize the critical information such as the appearance of an alarm indication. This stream regulation process is managed by the associated compression/decompression units and supplies the processing module MT with an indicator representative of a momentary saturation state of the transmission capacity, the percentage occupancy of the transmission capacity or the effective capacity available for the transmission of management streams at any given time.

Moreover, the remote station S1 may be equipped with a second compressor/decompressor to avoid a malfunction of the control module MC if the compressor/decompressor of the remote station S1 is faulty or loses its connection to the central station S2. The two compressors/decompressors are then installed in parallel, but with only one (the master) operating and the other (the slave) on standby. Each compressor/decompressor preferably then includes an observation module MO for continuous surveillance of exchanges established by its counterpart. If a repetitive inconsistency is detected in the output from one compressor/decompressor by the observation module MO of the other compressor/decompressor, or in the absence of output messages from the compressor/decompressor, the observation module MO that detects the problem transmits a command to the faulty compressor/decompressor to disable it and instructs its own compressor/decompressor to take over from the faulty one.

The control module MC, and in particular its processing module MT and its management module MG, may be produced in the form of electronic circuits, software (or electronic data processing) modules, or a combination of circuits and software.

It is important to note that the control module MC may be part of one of the managed equipments of the remote station S1, and in particular its compressor/decompressor.

The central station S2 receives compressed messages from the remote station S1, here via the satellite SAT. These messages including only state variations, in order to minimize the amount of management data to be transmitted, and thus the capacity of the transmission link (here the satellite SAT), it is advantageous for the central station to transform the state variations into current states in order to be able to make them available to the SNMP manager MS of the network.

To do this, the central station S2 comprises, in addition to its usual managed equipments, a control module MC' coupled to its compressor/decompressor CP and including memories M'k and a processing module MT'.

Each memory M'k (here k=1 to 5) is associated with one of the managed equipments of the remote station S1. It constitutes, so to speak, a replica of the MIB (M1, M2) of the equipments E11 and E22 incorporating an SNMP agent or of the MIB managed by the mediation agents MM1 to MM3 in the case of equipments (E21 to E23) that are not compatible with the SNMP protocol. Consequently, each memory M'k stores the latest known states of the management information relating to the managed equipment E1i or E2j with which it is associated.

Each memory M'k is preferably installed in (or coupled to) an SNMP agent type protocol agent APk (in the example described). Consequently, each memory M'k preferably takes the form of an MIB. Accordingly, if the SNMP manager needs to know one or more management information states relating to one or more equipments managed by the remote station S1, it has only to send one or more requests to this effect to the control module MC', with the result that each of its protocol agents APk processes the request that concerns it by consulting the MIB M'k to which it is coupled. It is therefore no longer necessary to send the remote station S1 requests from the SNMP manager MS whose function is to supply it with current management information states. This further reduces the amount of data that has to pass in transit through the satellite link SAT and therefore the capacity dedicated to this purpose. Moreover, this enables the current management information states to be supplied to the SNMP manager MS more quickly, and possibly more often.

Each protocol agent APk may optionally serve as an intermediary for the processing module MT' for accessing the latest known states stored in the memory M'k to which it is coupled and for updating the states in that memory M'k.

The processing module MT' of the central station S2 is responsible for updating the MIB M'k using the state variations contained in messages received from the satellite SAT. To this end it extracts from each message received each state variation that it contains and then compares it to the corresponding states stored in the MIB M'k of the corresponding managed equipment. To do this it uses the identifier (OID), or a condensed version of that identifier, that is associated in the message with the state variation, which designates the corresponding information and managed equipment. This comparison enables it to deduce the new management information state concerned, which it then substitutes for the preceding state stored in the MIB Mk' in order to update the latter. This updating process may also be effected by the processing module MT' without comparison with the earlier state of the information concerned, in particular in the context of binary indicators.

The processing module MT' of the central station S2 preferably generates control messages and/or configuration messages for the remote station S1 from commands of the same type coming from the SNMP manager. These commands are then forwarded to the compressor/decompressor CP in order to be compressed and multiplexed with payload traffic before being sent to the modem and then to the radio-frequency (RF) equipment and finally to the satellite SAT.

The control module MC', and in particular its processing module MT' and its protocol agents APk, may be produced in the form of electronic circuits, software (or electronic data processing) modules, or a combination of circuits and software.

It is important to note that the control module MC' may be part of one of the managed equipments of the central station S2 and in particular part of its compressor/decompressor.

Thanks to the invention, the SNMP manager MS and the managed equipments of the remote station S1 do not need to be modified. Their connection modes remain unchanged compared to the conventional solutions, while the capacity of the transmission link required for these connections (for example a satellite link) is very much less than is required by a conventional solution.

The invention is not limited to the remote transmission station, central transmission station and transmission installation embodiments described hereinabove by way of example only, and encompasses all variants that the person skilled in the art might envisage within the scope of the following claims.

Thus there is described hereinabove an application of the invention to a satellite relay installation. However, the invention applies to any transmission installation comprising at least one remote transmission station and at least one central transmission station that can send data to each other via a particular terrestrial (cable or radio) or satellite transmission link.

The invention is particularly advantageous in the context of satellite transmission networks operating in DAMA (Demand Assignment Multiple Access) or BOD (Bandwidth On Demand) mode, wherein the device according to the invention has the benefit at all times of portions of the pass-band that are not used by the payload traffic for routing critical management information in the best possible time and updating non-critical information at a high rate each time that the sum of the traffic routed is sufficiently low to allow non-priority streams significant transmission capacity, and all of this without having to fix a permanent and arbitrary dedicated capacity for each management link.

The invention claimed is:

1. A remote transmission station for a transmission infrastructure of a radio communication network comprising at least one equipment managing transmission station operating under an administration protocol, said remote transmission station comprising:
   managed equipments and being situated in a portion of the network separated from said equipment managing transmission station and operatively connected to said equipment managing transmission station by a transmission link of said infrastructure;
   a management module adapted to obtain management information states relating to said managed equipments from managed equipment memories that are each associated with one of the managed equipments; and
   a processing module adapted i) to store states previously obtained by said management module, ii) to compare newly obtained states with states previously stored, in order to determine state variations of each managed equipment and to update said memories with the newly obtained states, and iii) to generate messages including said state variations that have been determined in order for the messages to be sent to said equipment managing transmission station via said link;
   wherein at least certain of said managed equipments comprise a memory in which their current management information states are stored and a controller coupled to said memory and adapted to be consulted via a specific management protocol, and in that said management module comprises a mediation module adapted to dialog with each of said controllers according to the specific management protocol in order to obtain the states stored in the memories to which they are coupled.

2. The remote transmission station according to claim 1, wherein said processing module is adapted to associate with each of said state variations an identifier representative of management information and of the managed equipment corresponding thereto and to integrate each of said state variations and the associated identifier into said messages.

3. The remote transmission station according to claim 1, wherein at least some of said managed equipments comprise a local protocol agent coupled to a primary management information base in which its current management information states are stored, and in that said management module comprises a main protocol agent adapted to dialog with each local protocol agent in order to obtain the states stored in the associated management information base.

4. The remote transmission station according to claim 1, wherein said processing module is adapted to associate a priority level with each of said state variations that has been determined as a function of a control table so that the priority is given to sending that state variation having a highest priority level.

5. The remote transmission station according to claim 4, wherein said control table further defines a timing of state variation transmissions, and said processing module is adapted to generate said messages as a function of said timing.

6. The remote transmission station according to claim 1, wherein the remote transmission station comprises at least one managed equipment defining a data compressor/decompressor, including data contained in said messages, to be transmitted via said link, and to decompress the data compressed and received via said link.

7. The remote transmission station according to claim 1, wherein said administration protocol is an SNMP protocol, each of said local agents then being an SNMP agent and the main protocol agent then being an SNMP manager.

8. A remote transmission station for a transmission infrastructure of a radio communication network comprising at least one equipment managing transmission station operating under an administration protocol, said remote transmission station comprising:
   managed equipments and being situated in a portion of the network separated from said equipment managing transmission station and operatively connected to said equipment managing transmission station by a transmission link of said infrastructure;
   a management module adapted to obtain management information states relating to said managed equipments from managed equipment memories that are each associated with one of the managed equipments; and
   a processing module adapted i) to store states previously obtained by said management module, ii) to compare newly obtained states with states previously stored, in order to determine state variations of each of said managed equipments and to update said memories with the newly obtained states, and iii) to generate messages including said state variations that have been determined in order for the messages to be sent to said equipment managing transmission station via said link;
   wherein at least some of said managed equipments comprise a local protocol agent coupled to a primary management information base in which its current management information states are stored, and in that said management module comprises a main protocol agent adapted to dialog with each of said local protocol agent in order to obtain the states stored in the primary management information base; and
   further wherein at least certain of said managed equipments comprise a memory in which their current management information states are stored and a controller coupled to said memory and adapted to be consulted via a specific management protocol, and in that said management module comprises a mediation module adapted to dialog with said controller according to the specific management protocol in order to obtain the states stored in the memories to which they are coupled, and further characterized in that said mediation module defines local protocol agents each associated with one of said certain managed equipments and adapted to supply said main protocol agent with states coming from said certain managed equipments.

9. A remote transmission station for a transmission infrastructure of a radio communication network comprising at least one equipment managing transmission station operating under an administration protocol, said remote transmission station comprising:
   managed equipments and being situated in a portion of the network separated from said equipment managing transmission station and operatively connected to said equipment managing transmission station by a transmission link of said infrastructure;
   a management module adapted to obtain management information states relating to said managed equipments from managed equipment memories that are each associated with one of the managed equipments; and
   a processing module adapted i) to store states previously obtained by said management module, ii) to compare newly obtained states with states previously stored, in order to determine state variations of each managed equipment and to update said memories with the newly obtained states, and iii) to generate messages including said state variations that have been determined in order for the messages to be sent to said equipment managing transmission station via said link;
   wherein the remote transmission station comprises at least one managed equipment defining a data compressor/decompressor adapted to compress data, including data contained in said messages, to be transmitted via said link, and to decompress the data compressed and received via said link; and
   further wherein the remote transmission station comprises at least one other managed equipment defining another data compressor/decompressor, with said data compressors/decompressors being arranged such that one is operating while the other on standby, and each of said data compressors/decompressors further comprising an observation part adapted to observe the operation of the other compressor/decompressor to force its own compressor/decompressor to operate in place of the other one in the event of detection of a problem with an operation of the latter.

10. A central transmission station for a transmission infrastructure of a radio communication network comprising an equipment managing transmission station operating under an administration protocol, said central transmission station being situated in a portion of the network comprising said equipment managing transmission station, wherein said central transmission station comprises:

memories each associated with one of a managed equipments of a remote transmission station wherein latest known management information states relating to each of said managed equipments are stored; and a processing module adapted to analyze messages received from said remote transmission station via a transmission link of the infrastructure, to extract state variations that the messages contain and to compare the state variations to corresponding states stored in said memories in order to determine corresponding new states and to update said memories with the corresponding new states that have been determined;

wherein the central transmission station comprises protocol agents a number whereof is equal to a number of managed equipments of said remote transmission station, each of which is coupled to said processing module and to one of said memories, and each of which is adapted to consult an associated memory of said memories at a request of said equipment managing transmission station with a view to sending it current management information states.

11. The central transmission station according to claim 10, wherein each memory constitutes a secondary management information base.

12. The central transmission station according to claim 10, wherein said processing module is adapted to generate control messages and/or configuration messages to said remote transmission station with a view to obtaining state variations relating to at least one of its managed equipments and/or to configuring said managed equipments.

13. The central transmission station according to claim 10, wherein the central transmission station comprises a data compressor/decompressor adapted to decompress data, including data contained in said messages received via said link, and to compress the data with a view to sending it to said remote transmission station via said link.

14. The central transmission station according to claim 10, wherein said administration protocol is an SNMP protocol.

* * * * *